(12) United States Patent  
Crawley

(10) Patent No.: US 8,725,214 B1
(45) Date of Patent: May 13, 2014

(54) METHOD OF TUNING A FREQUENCY AGILE ELECTRICALLY SMALL TACTICAL AM BROADCAST BAND ANTENNA SYSTEM

(71) Applicant: Ken Allen Crawley, Saint George, SC (US)

(72) Inventor: Ken Allen Crawley, Saint George, SC (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/690,449

(22) Filed: Nov. 30, 2012

(51) Int. Cl.
H04M 1/00 (2006.01)
H04B 1/034 (2006.01)
H03C 1/52 (2006.01)
H01Q 11/12 (2006.01)
H04B 1/04 (2006.01)

(52) U.S. Cl.
USPC ........... 455/562.1; 455/97; 455/108; 455/123

(58) Field of Classification Search
USPC .............. 455/561, 562.1, 95, 96, 97, 99, 107, 455/108, 120, 121, 123, 125; 343/711, 745, 343/790, 874
See application file for complete search history.

(56) References Cited

U.S. PATENT DOCUMENTS

| | | | | |
|---|---|---|---|---|
| 3,253,279 | A * | 5/1966 | Tanner | 343/849 |
| 3,618,105 | A * | 11/1971 | Bruene et al. | 343/747 |
| 3,778,731 | A * | 12/1973 | Oomen | 333/17.1 |
| 4,201,960 | A * | 5/1980 | Skutta et al. | 333/17.3 |
| 5,521,607 | A * | 5/1996 | Deasy | 343/745 |
| 8,350,769 | B1 * | 1/2013 | Crawley | 343/745 |
| 2009/0289866 | A1 * | 11/2009 | Parsche | 343/790 |
| 2011/0007157 | A1 * | 1/2011 | Sekelsky et al. | 348/143 |
| 2012/0249391 | A1 * | 10/2012 | Lill et al. | 343/793 |
| 2013/0307748 | A1 * | 11/2013 | Martek et al. | 343/853 |

* cited by examiner

Primary Examiner — Nguyen Vo
(74) Attorney, Agent, or Firm — SPAWAR Systems Center Atlantic; Arthur K. Samora; Kyle Eppele

(57) ABSTRACT

A Method of Tuning a Frequency Agile Electrically Small Tactical AM Broadcast Band Antenna System (NC#102174) comprising determining a desired operating frequency for a frequency agile electrically small tactical AM broadcast band antenna system; configuring tophat jumpers of the frequency agile electrically small tactical AM broadcast band antenna system to operate near the desired operating frequency; erecting an antenna of the frequency agile electrically small tactical AM broadcast band antenna system; transmitting a signal through the frequency agile electrically small tactical AM broadcast band antenna system; adjusting inductor values of an antenna tuning unit of the frequency agile electrically small tactical AM broadcast band antenna system so that the frequency agile electrically small tactical AM broadcast band antenna system operates at the desired operating frequency.

8 Claims, 14 Drawing Sheets

Note: All FIGURES are NOT drawn to scale

US 8,725,214 B1

METHOD OF TUNING A FREQUENCY AGILE ELECTRICALLY SMALL TACTICAL AM BROADCAST BAND ANTENNA SYSTEM

FEDERALLY SPONSORED RESEARCH AND DEVELOPMENT

This invention (Navy Case No. 102174) is assigned to the United States Government and is available for licensing for commercial purposes. Licensing and technical inquiries may be directed to the Office of Research and Technical Applications, Space and Naval Warfare Systems Center, Code 51000-CTO, N. Charleston, S.C., 29419; voice (843) 218-4000; email T2@spawar.navy.mil. Reference Navy Case Number 102174.

CROSS-REFERENCE TO RELATED APPLICATION

This application is a continuation-in-part of U.S. application Ser. No. 12/051,887, filed Mar. 20, 2008, entitled "Frequency Agile Electrically Small Tactical AM Broadcast Band Antenna System" (NC#098978), hereby incorporated by reference herein in its entirety for its teachings on antenna systems, and referred to hereafter as "the parent application."

BACKGROUND OF THE INVENTION

The Method of Tuning a Frequency Agile Electrically Small Tactical AM Broadcast Band Antenna System is generally in the field of antenna systems.

Typical antenna systems require a broadcast engineer to setup and maintain the antenna system, which is expensive. In addition, typical antenna systems require power shutdowns to tune the antenna system.

A need exists for an antenna system that does not require a broadcast engineer to setup and maintain the antenna system. In addition, a need exists for an antenna system that does not require power shutdowns to tune the antenna system.

BRIEF DESCRIPTION OF THE DRAWINGS

All FIGURES are not drawn to scale.

DETAILED DESCRIPTION OF THE INVENTION

Described herein is Method of Tuning a Frequency Agile Electrically Small Tactical AM Broadcast Band Antenna System.

DEFINITIONS

The following acronym(s) are used herein:
Acronym(s):
AM—Amplitude Modulation
ATU—Antenna Tuning Unit
FAAS—Frequency Agile electrically small tactical AM broadcast band antenna System
Tx—Transmitter The frequency agile electrically small tactical AM broadcast band antenna system includes a transmitter, an antenna tuning unit (ATU) and an antenna mast. The transmitter is operatively coupled to the ATU and is designed to transmit AM radio frequency signals to the ATU. The ATU is operatively coupled to the antenna mast and is designed to tune the antenna system to a desired frequency. The antenna mast includes a support mast and an electric mast. The ATU is operatively coupled to the electric mast. The support mast is designed to provide physical support for the electric mast.

Figure 1:
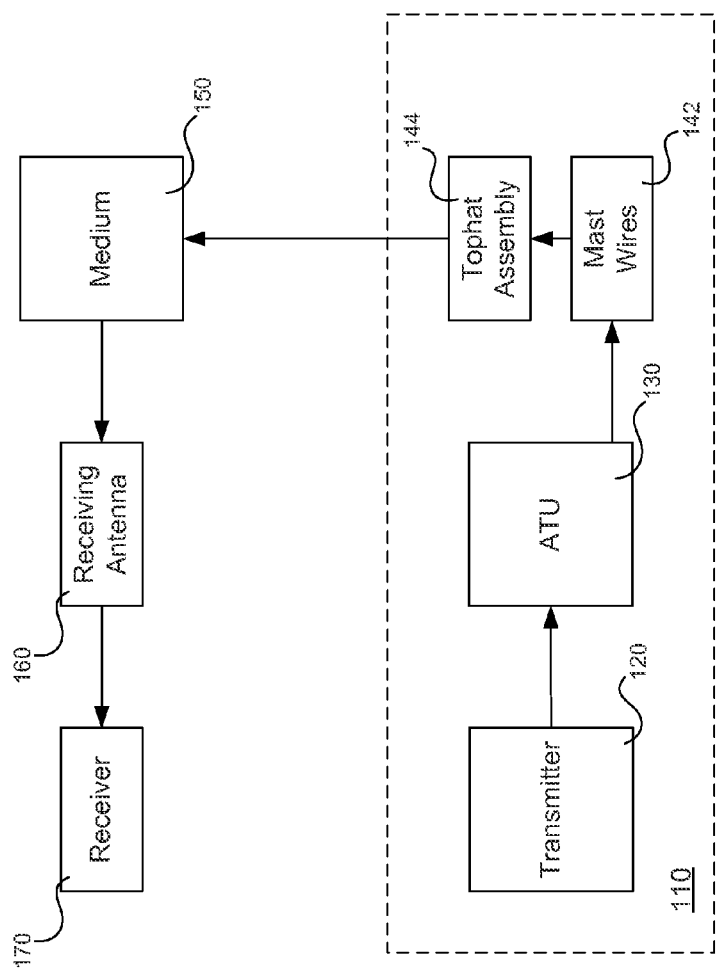
FIG. 1 is a block diagram of one embodiment of a frequency agile electrically small tactical AM broadcast band antenna system.

FIG. 1 is a block diagram of one embodiment of a frequency agile electrically small tactical AM broadcast band antenna system (FAAS). As shown in FIG. 1, FAAS 110 includes transmitter 120, ATU 130, mast wires 142 and configurable tophat assembly 144. In one embodiment, transmitter 120 comprises an AM transmitter. Transmitter 120 is operatively coupled to ATU 130 and is designed to transmit AM radio frequency signals to ATU 130. ATU 130 is designed to tune FAAS 110 to a desired frequency. ATU 130 is operatively coupled to ground for electric reference purposes. In one embodiment, ATU is operatively coupled to a ground rod that is inserted into the ground, a ground radial wire assembly that spans an area around FAAS 110, and an ATU ground connection. ATU 130 is operatively coupled to mast wires 142.

Mast wires 142 receive AM radio frequency signals from ATU 130 and output AM radio frequency signals to configurable tophat assembly 144. Configurable tophat assembly 144 is operatively coupled to mast wires 142 and transmits AM radio frequency signals to receiving antenna 160 via medium 150. In one embodiment, medium 150 is air. Receiving antenna 160 is operatively coupled and outputs AM radio frequency signals to receiver 170. Receiver 170 receives and demodulates AM radio frequency signals.

Figure 2:
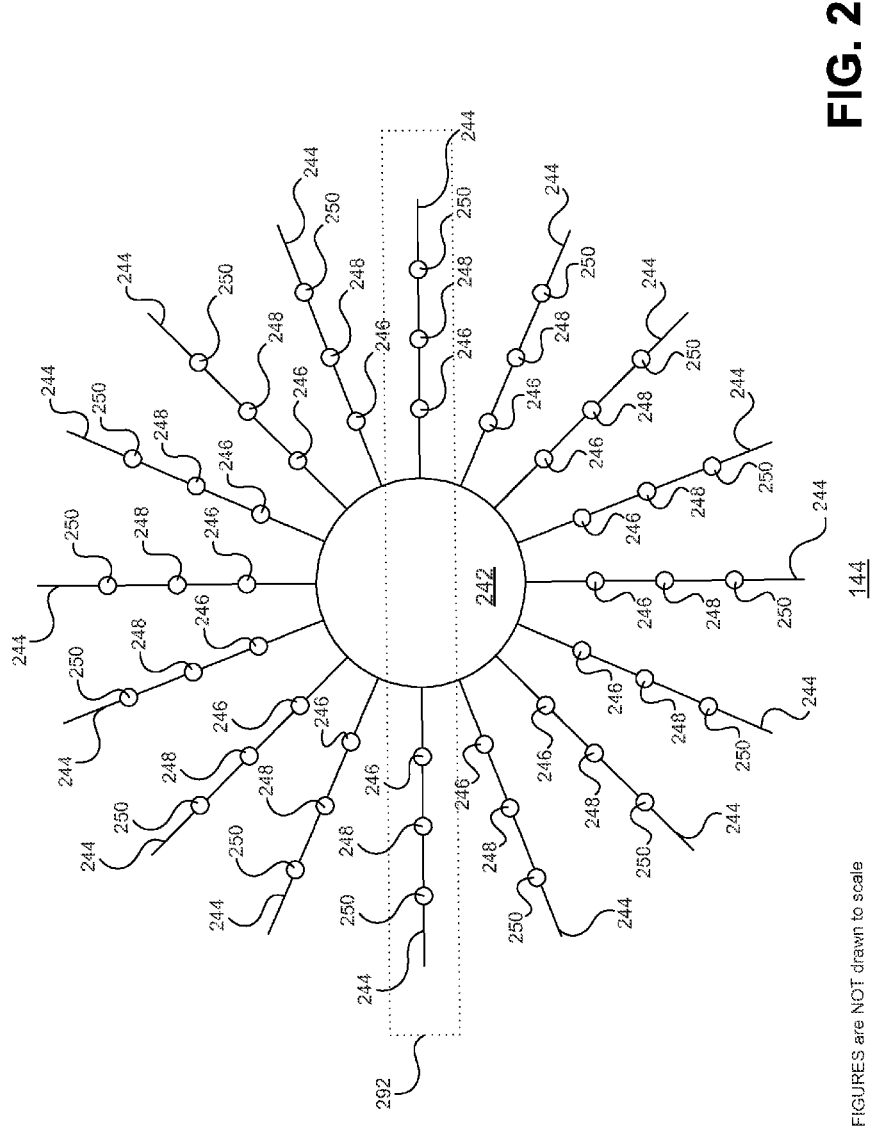
FIG. 2 is a top view of one embodiment of a configurable tophat assembly of a frequency agile electrically small tactical AM broadcast band antenna system.

FIG. 2 is a top view of one embodiment of a configurable tophat assembly of a FAAS. As shown in FIG. 2, configurable tophat assembly 144 includes tophat disc 242, tophat wires 244, and tophat jumpers 246, 248, 250. Tophat disc 242 comprises a conductive material capable of transmitting radio frequency signals such as aluminum or copper. In one embodiment, tophat disc 242 comprises copper. Tophat disc 242 provides a common electric node for tophat wires 244. Tophat disc 242 is operatively coupled to tophat wires 244.

Tophat wires 244 comprise a conductive material. In one embodiment, tophat wires 244 comprise copper. In one embodiment, tophat wires 244 comprise sixteen separate copper wires. In one embodiment, tophat wires 244 are approximately 99 feet in length. Tophat wires 244 are segmented by tophat jumpers 246, 248, 250 at predetermined lengths so that configurable tophat assembly 144 can have multiple configurations. Tophat jumpers 246, 248, 250 can be in one of two states: an electrical open or an electrical short. In one embodiment, tophat jumpers 246, 248, 250 comprise an insulator, tophat wire connectors, and a common node, where the tophat wire connectors are connected to separate and adjacent segments of tophat wire 244. In an electrical open state, the tophat wire connectors are not connected to each other or the common node. In an electrical short state, the tophat wire connectors are connected to each other though the common node. Tophat jumpers 246, 248, 250 are situated at predetermined lengths along tophat wires 244 and are designed to change the operational properties of configurable tophat assembly 144. Those skilled in the art shall recognize that these predetermined lengths can be changed without departing from the scope and spirit of the antenna system.

In one embodiment, tophat jumpers 246 are situated 25 feet from a proximal end of tophat wires 244 (i.e., the ends of tophat wires 244 that are closest to tophat disc 242). In one embodiment, tophat jumpers 248 are situated 45 feet from a proximal end of tophat wires 244. In one embodiment, tophat jumpers 250 are situated 75 feet from a proximal end of tophat wires 244. Cutaway 292 represented by a box having dashed lines is now described in FIG. 3.

Figure 3:
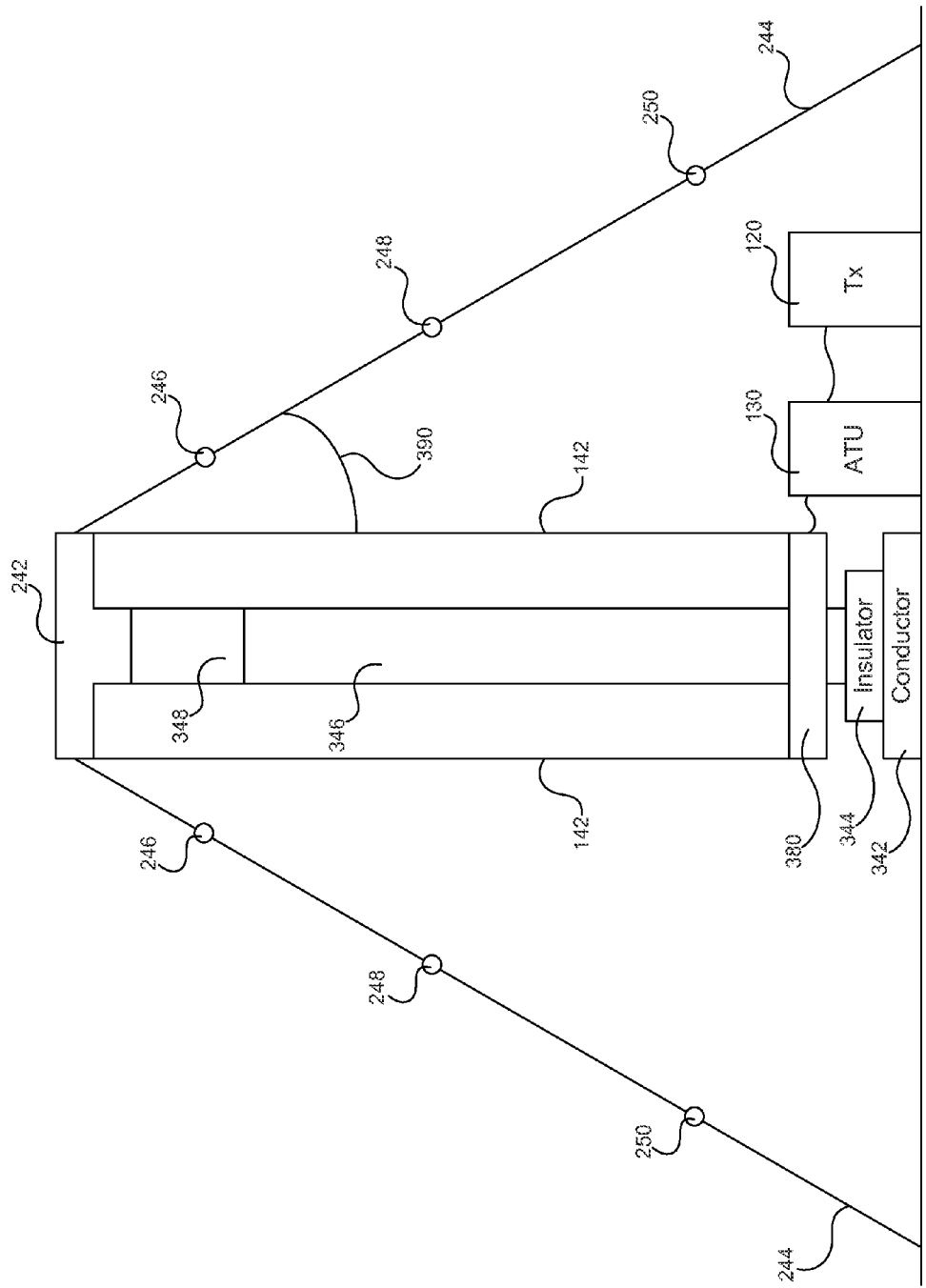
FIG. 3 is a cutaway side view of one embodiment of a frequency agile electrically small tactical AM broadcast band antenna system.

FIG. 3 is a cutaway side view of one embodiment of a FAAS. FIG. 3 is a side view representing cutaway 292 of FIG. 2. As shown in FIG. 3, FAAS 300 includes transmitter (Tx) 120, ATU 130, tophat disc 242, tophat wires 244, tophat jumpers 246, 248, 250, conductor base 342, insulator base 344, base mast 346, insulator mast 348, mast ring 380, and mast wires 142. Conductor base 342 comprises a conductive material. In one embodiment, conductor base 342 comprises copper. In one embodiment, conductor base 342 has a thickness of ¼ inch. In one embodiment, conductor base 342 comprises a thin, flat disc. Conductor base 342 is operatively coupled to a ground rod (not shown in any FIGURES), which is inserted into the ground. Conductor base 342 is operatively coupled to a network of ground radial wires (not shown in any FIGURES). In one embodiment, a network of ground radial wires comprises lengths of conductive wire that have proximal ends operatively coupled to conductor base 342 and distal ends situated in an imaginary concentric circle that has a diameter greater than a diameter of conductor base 342, wherein the ground radial wires are approximately evenly spaced with respect to radians around conductor base 342 (i.e., with respect to a top view). Conductor base 342 is operatively coupled to insulator base 344, which isolates base mast 346 from earth ground.

Insulator base 344 comprises an insulator material. In one embodiment, insulator base 344 comprises fiberglass. In one embodiment, insulator base 344 comprises epoxy resin and glass substrate. In one embodiment, insulator base 344 comprises G10. In one embodiment, insulator base 344 comprises a flat disc that is approximately greater than or equal to four inches in thickness. Insulator base 355 is operatively coupled to base mast 346.

Base mast 346 comprises a sturdy material. In one embodiment, base mast 346 comprises steel. In one embodiment, base mast 346 comprises aluminum. In one embodiment, base mast 346 comprises a telescopic boom. Base mast 346 has a length sufficient enough to situate tophat disc 242 a predetermined distance above ground. In one embodiment, tophat disc 242 is approximately 60 feet above ground. Base mast 346 provides support for insulator mast 348 and configurable tophat assembly 242. In one embodiment, base mast 346 further comprises non-conducting guy wires to provide structural support. In one embodiment, base mast 346 further comprises multiple tiers of guy wires at various lengths along base mast 346. Base mast 346 is operatively coupled to insulator mast 348.

Insulator mast 348 comprises an insulator material. In one embodiment, insulator mast 348 comprises fiberglass. In one embodiment, insulator mast 348 comprises an epoxy resin and glass substrate. In one embodiment, insulator mast 348 comprises G10. In one embodiment, insulator mast 348 comprises a cylinder. Insulator mast 348 is operatively coupled to tophat disc 242. The configurable tophat assembly (i.e., tophat disc 242, tophat wires 244, and tophat jumpers 246, 248, 250) have been described above with reference to FIG. 2, and thus, will not be described again. Angle 390 is formed between an imaginary vertical line and tophat wires 244. In one embodiment, angle 390 is approximately equal to 60 degrees.

Mast wires 142 are operatively coupled to tophat disc 242 so that mast wires 142 are approximately evenly spaced with respect to a radial view. Mast wires 142 are substantially parallel to base mast 346. In one embodiment, mast wires 142 comprise eight separate copper wires. Mast wires 142 are operatively coupled to mast ring 380, which provides a common electrical node for mast wires 142. Mast ring 380 is described in detail below with reference to FIG. 4. Mast wires 142 are operatively coupled to ATU 130 via mast ring 380. ATU 130 is operatively coupled to transmitter 120.

Figure 4:
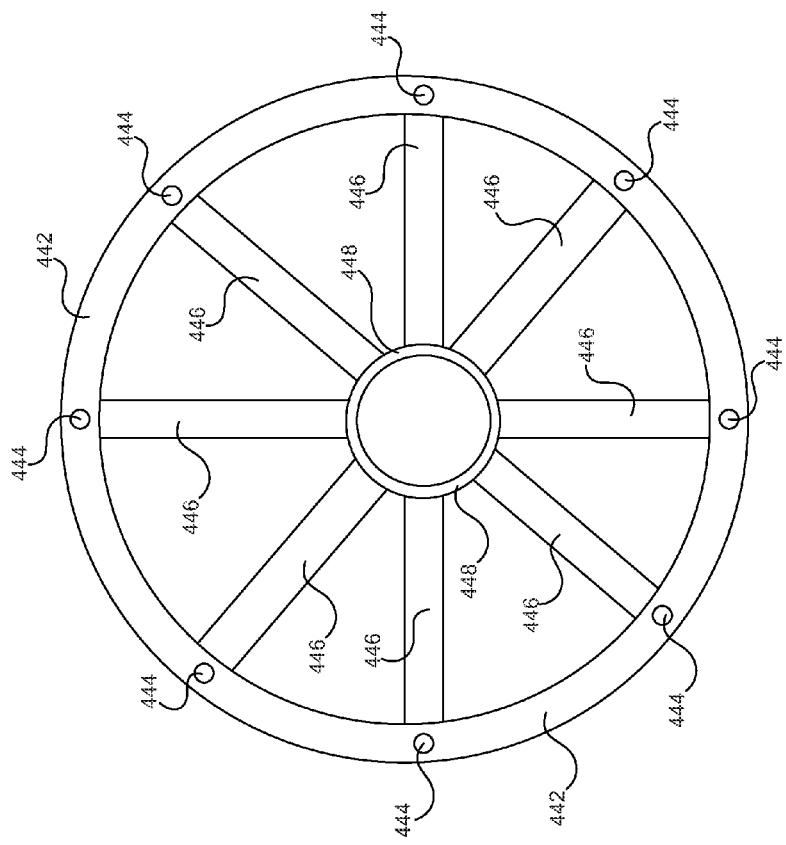
FIG. 4 is a top view of one embodiment of one component of a frequency agile electrically small tactical AM broadcast band antenna system.

FIG. 4 is a top view of one embodiment of one component of a FAAS. As shown in FIG. 4, mast ring 380 comprises conductor ring 442, mast ring mast wire couplers 444, radial supports 446, and base mast coupler 448. Base mast coupler 448 comprises a sturdy material designed to operatively couple support mast ring 380 to base mast 346 of FIG. 3 (not shown in FIG. 4). Base mast coupler 448 has an inner diameter slightly larger than an outer diameter of base mast 346 of FIG. 3. In one embodiment, base mast coupler 448 comprises insulator material. In one embodiment, base mast coupler 448 comprises conductor material. Radial supports 446 comprise an insulator material and are designed to operatively couple base mast coupler 448 and conductor ring 442 to provide support for conductor ring 442. In one embodiment, mast ring 380 comprises eight radial supports 446.

Conductor ring 442 comprises a conductive material. In one embodiment, conductor ring 442 comprises copper. Mast ring mast wire couplers 444 are designed to operatively couple mast wires 142 of FIG. 3 (not shown in FIG. 4) to conductor ring 442, which provides a common electrical node. Mast ring mast wire couplers 444 comprise conductive material. In one embodiment, mast ring mast wire couplers 444 comprise metal screws. In one embodiment, mast ring mast wire couplers 444 comprise metal nuts and bolts.

Figure 5:
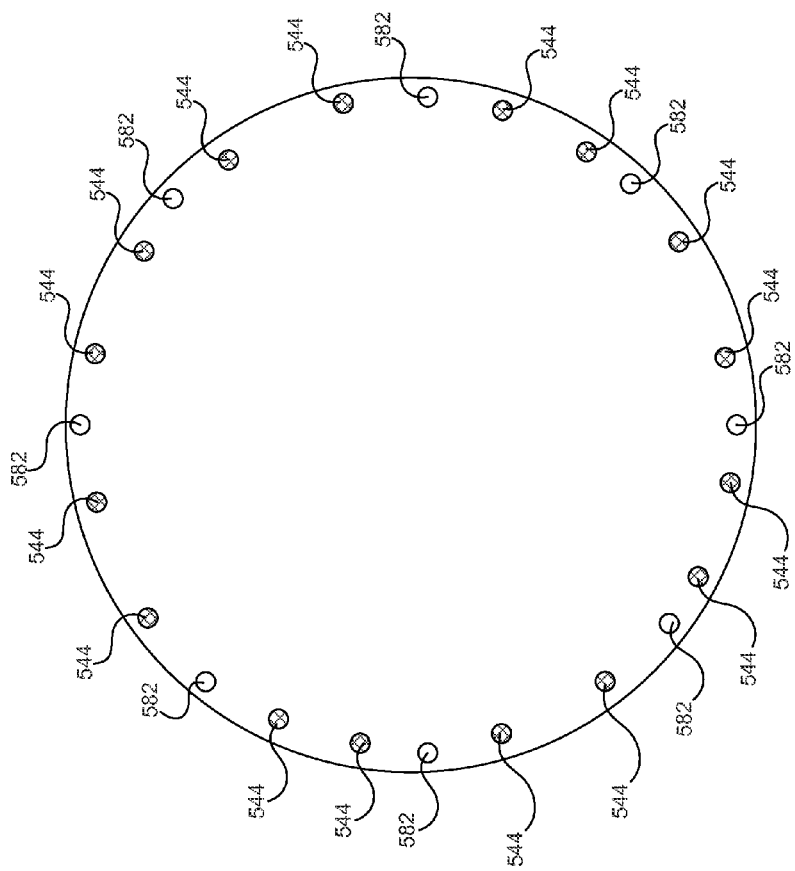
FIG. 5 is a top view of one embodiment of one component of a frequency agile electrically small tactical AM broadcast band antenna system.

FIG. 5 is a top view of one embodiment of one component of a FAAS. As shown in FIG. 5, tophat disc 242 comprises tophat wire couplers 544 and tophat mast wire couplers 582. Tophat wire couplers 544 and tophat mast wire couplers 582 are substantially similar to mast ring mast wire couplers 444 of FIG. 4, and thus, are not described in detail again. Tophat wire couplers 544 operatively couple tophat disc 242 and tophat wires 244 of FIGS. 2 and 3 (not shown in FIG. 5). Tophat mast wire couplers 582 operatively couple tophat disc 242 and mast wires 142 of FIG. 3 (not shown in FIG. 5).

To provide a better understanding of the operation of the exemplary embodiments of FAAS described above, an exemplary operation is now described with reference to FIGS. 1-3. An operator (who does not need to be a broadcast engineer) configures tophat jumpers 246, 248, 250 depending on factors such as desired operating frequency, local topography and tuner electronics. After raising configurable tophat assembly 144 of FIG. 2 via base mast 346 and insulator mast 348 of FIG. 3, the operator attempts to tune the FAAS to a desired operating frequency using ATU 130. Upon failure to tune the FAAS, the operator reconfigures tophat jumpers 246, 248, 250 to a different configuration from the original configuration. The operator may be required to lower configurable tophat assembly 144 to reconfigure tophat jumpers 246, 248, 250 and raise configurable tophat assembly 144 after reconfiguration.

After raising configurable tophat assembly 144 of FIG. 2 via base mast 346 and insulator mast 348 of FIG. 3, the operator attempts to tune the FAAS to a desired operating frequency (thus, the antenna is frequency agile) within the AM Broadcast band using ATU 130 which is simplistically configured using two motorized inductors. Upon failure to tune the FAAS, the operator reconfigures tophat jumpers 246, 248, 250 to a different configuration from the original configuration. The operator may be required to lower configurable tophat assembly 144 to reconfigure tophat jumpers 246, 248, 250 and raise configurable tophat assembly 144 after reconfiguration, a task done without engineering assistance. The operator continues to attempt tuning and reconfiguring until tuning the FAAS to the desired operating frequency is accomplished using two simple switches to control the two motorized inductors.

Those experienced in the art will recognize that the configurable tophat assembly is adjusted such that the input impedance of the antenna is kept within that certain region whereupon a dual inductor ATU configuration can be used. The operator continues to attempt tuning and reconfiguring until tuning the FAAS to the desired operating frequency is accomplished.

Figure 6:
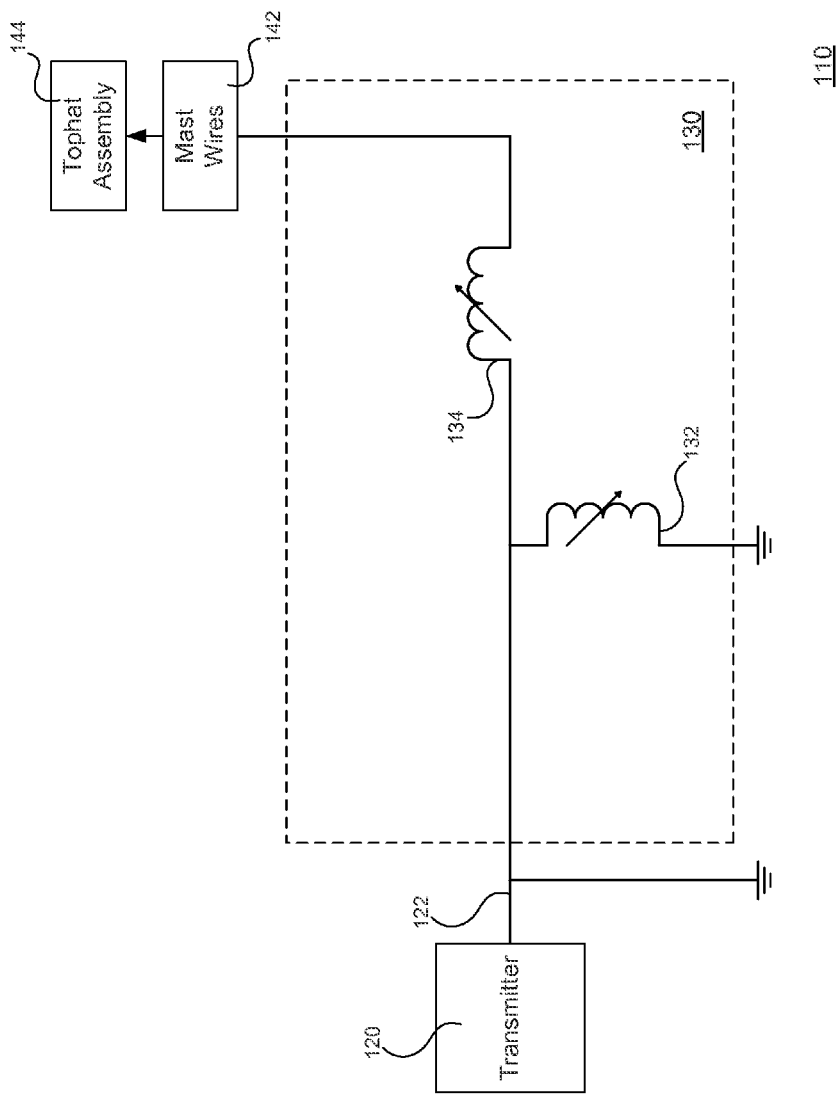
FIG. 6 is a block/schematic diagram of one embodiment of a frequency agile electrically small tactical AM broadcast band antenna system.

FIG. 6 is a block/schematic diagram of one embodiment of a frequency agile electrically small tactical AM broadcast band antenna system (FAAS). FIG. 6 is substantially similar to FIG. 1, and thus, similar/identical components are not described in detail again. As shown in FIG. 6, FAAS 110 includes transmitter 120, transmission line 122, ATU 130, mast wires 142, and configurable tophat assembly 144. Transmitter 120 is operatively coupled to ATU 130 via transmission line 122. In one embodiment, transmission line 122 comprises a 50-ohm feedline. Transmission line 122 is operatively coupled to ground for electric reference purposes. Transmission line 122 is designed to transmit an electronic signal to ATU 130. ATU 130 is designed to tune FAAS 110 to a desired frequency. ATU 130 is operatively coupled to mast wires 142.

In the embodiment shown in FIG. 6, ATU 130 comprises shunt variable inductor 132 and series variable inductor 134. Shunt variable inductor 132 and series variable inductor 134 are designed to be capable of varying their inductance values to a desired inductance value. One of ordinary skill in the electronic arts shall recognize that any variable inductor may be used for shunt variable inductor 132 and series variable inductor 134 without any loss of functionality of ATU 130. Shunt variable inductor 132 has a first terminal operatively coupled to transmission line 122 and a second terminal operatively coupled to ground. In one embodiment, shunt variable inductor 132 comprises a roller inductor capable of varying inductance. Series variable inductor 134 has a first terminal operatively coupled to transmission line 122 and a second terminal operatively coupled to mast wires 142. In one embodiment, series variable inductor 134 comprises a roller inductor capable of varying inductance.

Figure 7:
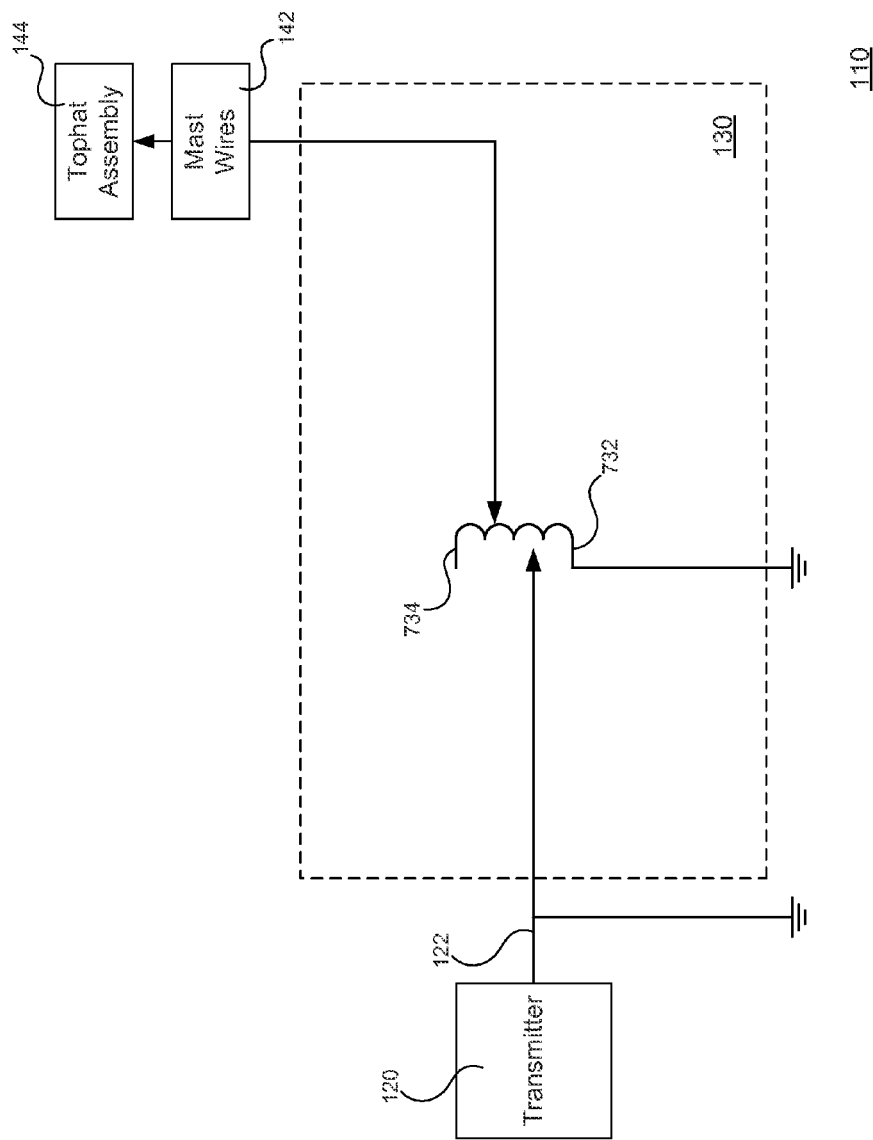
FIG. 7 is a block/schematic diagram of one embodiment of a frequency agile electrically small tactical AM broadcast band antenna system.

FIG. 7 is a block/schematic diagram of one embodiment of a frequency agile electrically small tactical AM broadcast band antenna system (FAAS). FIG. 7 is substantially similar to FIGS. 1 and 6, and thus, similar/identical components are not described in detail again. As shown in FIG. 7, FAAS 110 includes transmitter 120, transmission line 122, ATU 130, mast wires 142, and configurable tophat assembly 144.

In the embodiment shown in FIG. 7, ATU 130 comprises a single coil designed to embody the electrical properties of shunt variable inductor 132 and series variable inductor 134 of FIG. 6. Shunt variable inductor 732 and series variable inductor 734 of FIG. 7 are electrically created by electrically coupling transmission line 122 and mast wires 142 to the single coil to obtain desired inductance values for shunt variable inductor 732 and series variable inductor 734. In one embodiment, the single coil has a first terminal and a second terminal, wherein the second terminal is operatively coupled to ground. Transmission line 122 is operatively coupled to the single coil at a length of coil corresponding to a desired inductance for shunt variable inductor 732. Transmission line 122 is designed to operatively couple to the single coil at any of a number of varying lengths of coil. In one embodiment, transmission line 122 is operatively coupled to the single coil via a conductive alligator clip. Mast wires 142 are operatively coupled to the single coil between the first terminal and transmission line 122 wherein a length of coil between transmission line 122 and mast wires 142 correspond to a desired inductance for series variable inductor 734. Mast wires 142 are designed to operatively couple to the single coil at any of a number of varying lengths of coil. In one embodiment, mast wires 142 are operatively coupled to the single coil via a conductive alligator clip.

Figure 8:
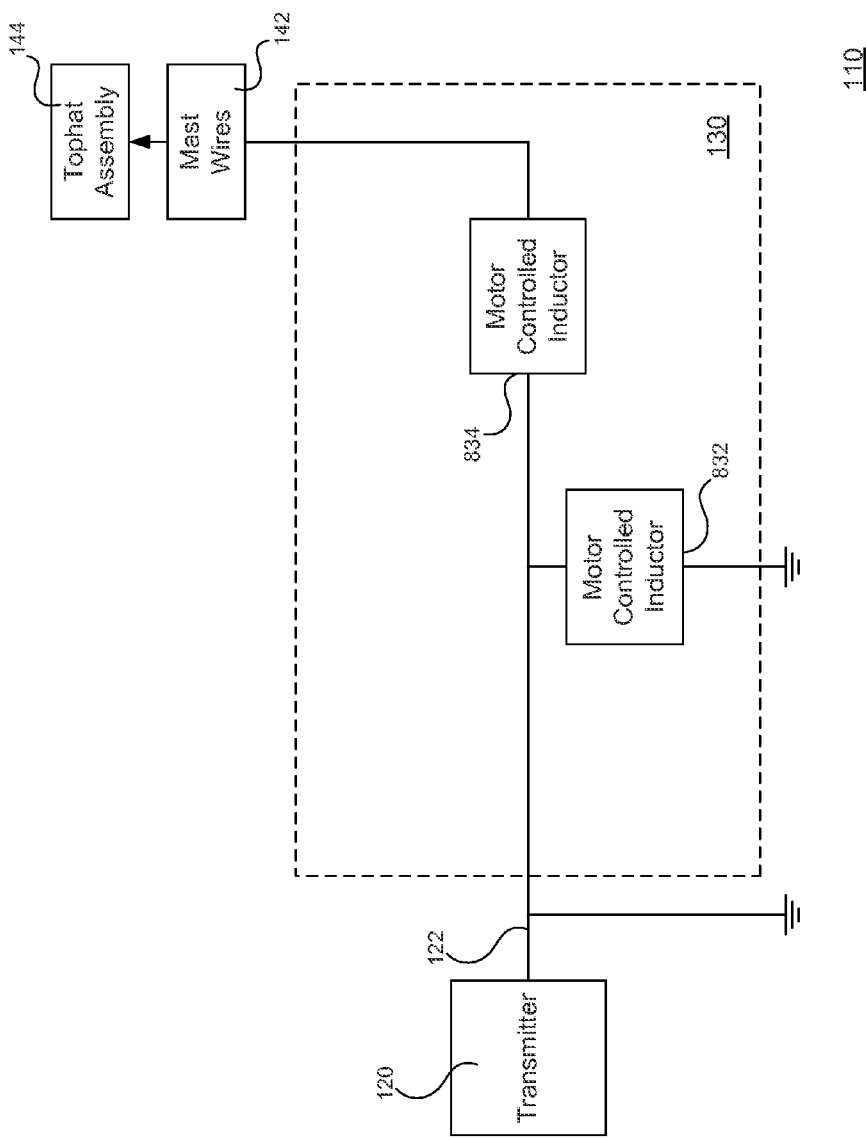
FIG. 8 is a block diagram of one embodiment of a frequency agile electrically small tactical AM broadcast band antenna system.

FIG. 8 is a block diagram of one embodiment of a frequency agile electrically small tactical AM broadcast band antenna system (FAAS). FIG. 8 is substantially similar to FIGS. 1 and 6-7, and thus, similar/identical components are not described in detail again. As shown in FIG. 8, FAAS 110 includes transmitter 120, transmission line 122, ATU 130, mast wires 142, and configurable tophat assembly 144.

In the embodiment shown in FIG. 8, ATU 130 comprises motor-controlled shunt variable inductor 832 and motor-controlled series variable inductor 834. Motor-controlled shunt variable inductor 832 and motor-controlled series variable inductor 834 each comprise any variable inductor capable of varying inductance via a motor. In one embodiment, motor-controlled shunt variable inductor 832 and motor-controlled series variable inductor 834 each comprise a roller inductor capable of varying inductance, wherein a motor controls each roller inductor.

Figure 9:
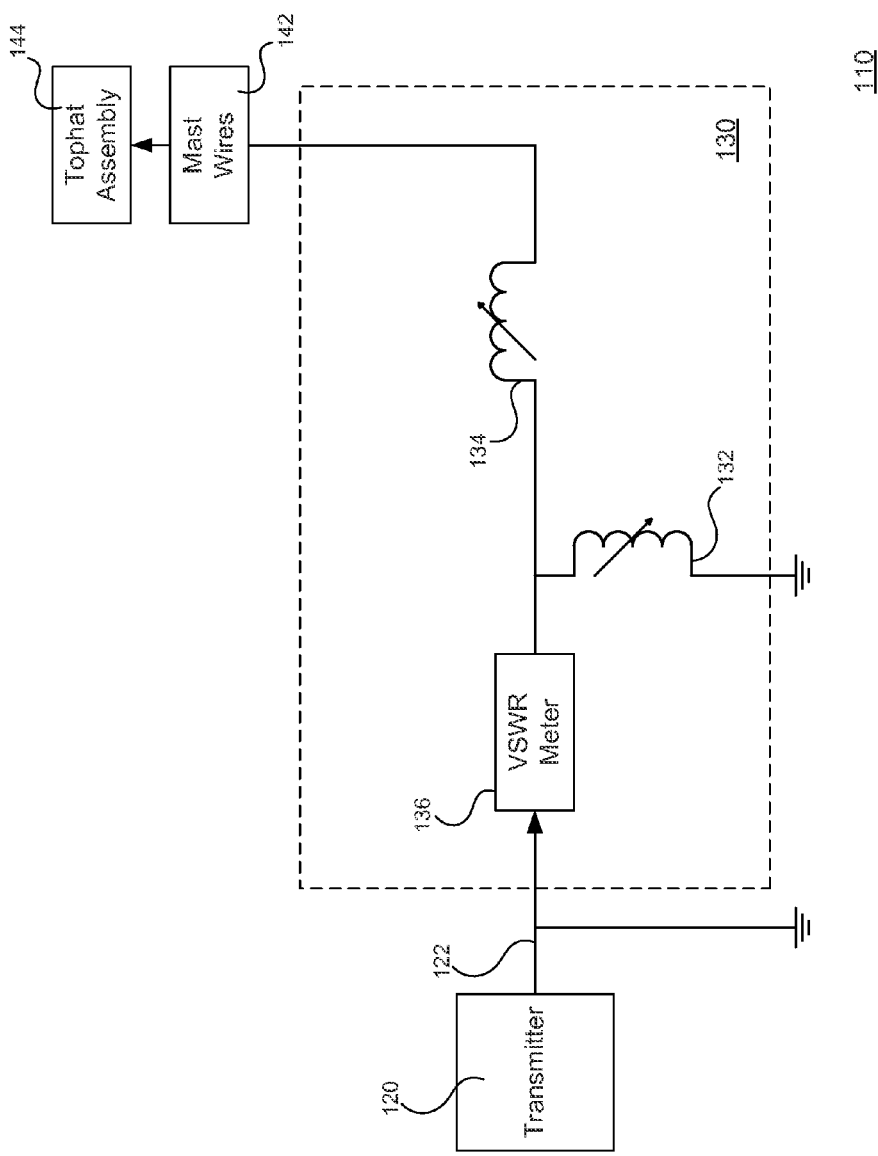
FIG. 9 is a block/schematic diagram of one embodiment of a frequency agile electrically small tactical AM broadcast band antenna system.

FIG. 9 is a block/schematic diagram of one embodiment of a frequency agile electrically small tactical AM broadcast band antenna system (FAAS). FIG. 9 is substantially similar to FIGS. 1 and 6, and thus, similar/identical components are not described in detail again. As shown in FIG. 9, FAAS 110 includes transmitter 120, transmission line 122, ATU 130, mast wires 142, and configurable tophat assembly 144.

In the embodiment shown in FIG. 9, ATU 130 comprises VSWR meter 136, shunt variable inductor 132, and series variable inductor 134. VSWR meter 136 is operatively coupled to transmission line 122, the first terminal of shunt variable inductor 132, and the first terminal of series variable inductor 134. VSWR meter 136 comprises a standing wave ratio or voltage standing wave ratio meter designed to measure a standing wave ratio in a transmission line. VSWR meter 136 is designed to indicate the degree of matching between transmitter 120 and ATU 130. In one embodiment, a standing wave ratio of 1:1 indicates a high degree of matching between transmitter 120 and ATU 130.

Figure 10:
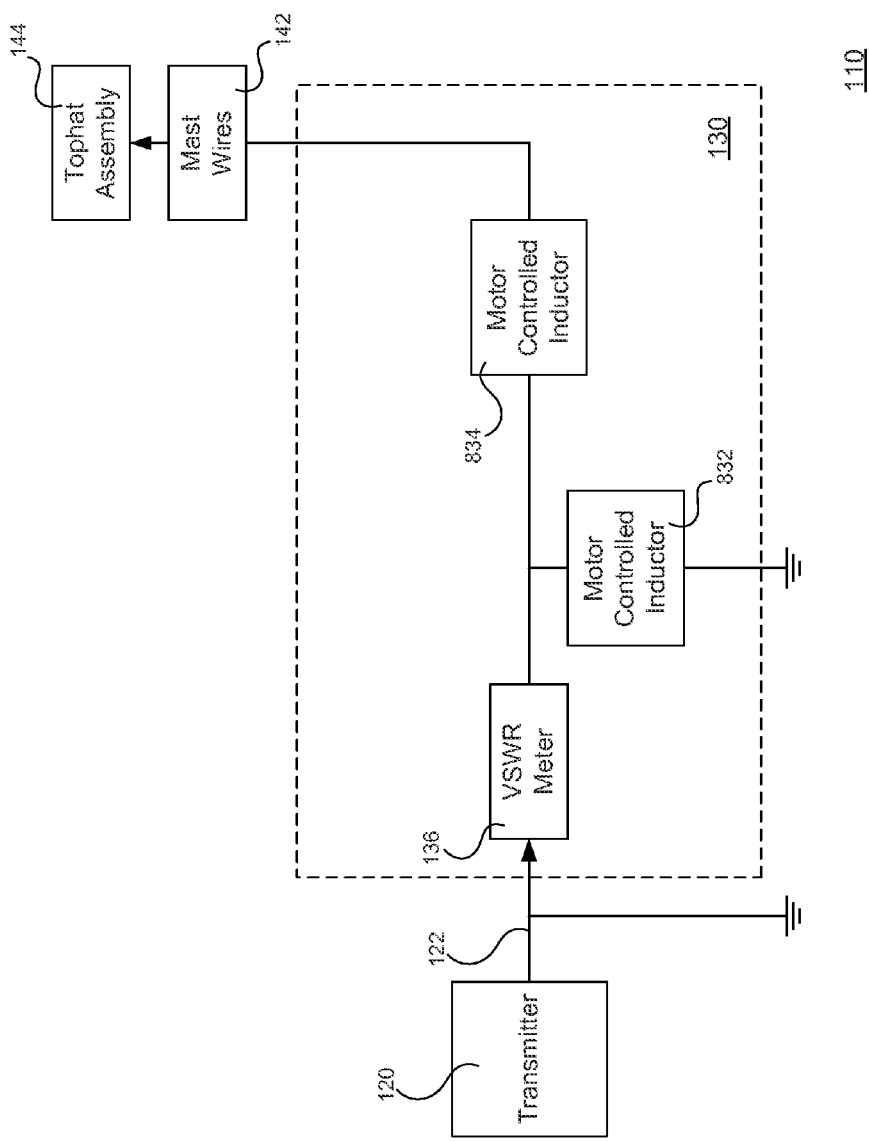
FIG. 10 is a block diagram of one embodiment of a frequency agile electrically small tactical AM broadcast band antenna system.

FIG. 10 is a block diagram of one embodiment of a frequency agile electrically small tactical AM broadcast band antenna system (FAAS). FIG. 10 is substantially similar to FIGS. 1, 6, and 8-9, and thus, similar/identical components are not described in detail again. As shown in FIG. 10, FAAS 110 includes transmitter 120, transmission line 122, ATU 130, mast wires 142, and configurable tophat assembly 144. In the embodiment shown in FIG. 10, ATU 130 comprises VSWR meter 136, motor-controlled shunt variable inductor 832 and motor-controlled series variable inductor 834.

Figure 11:
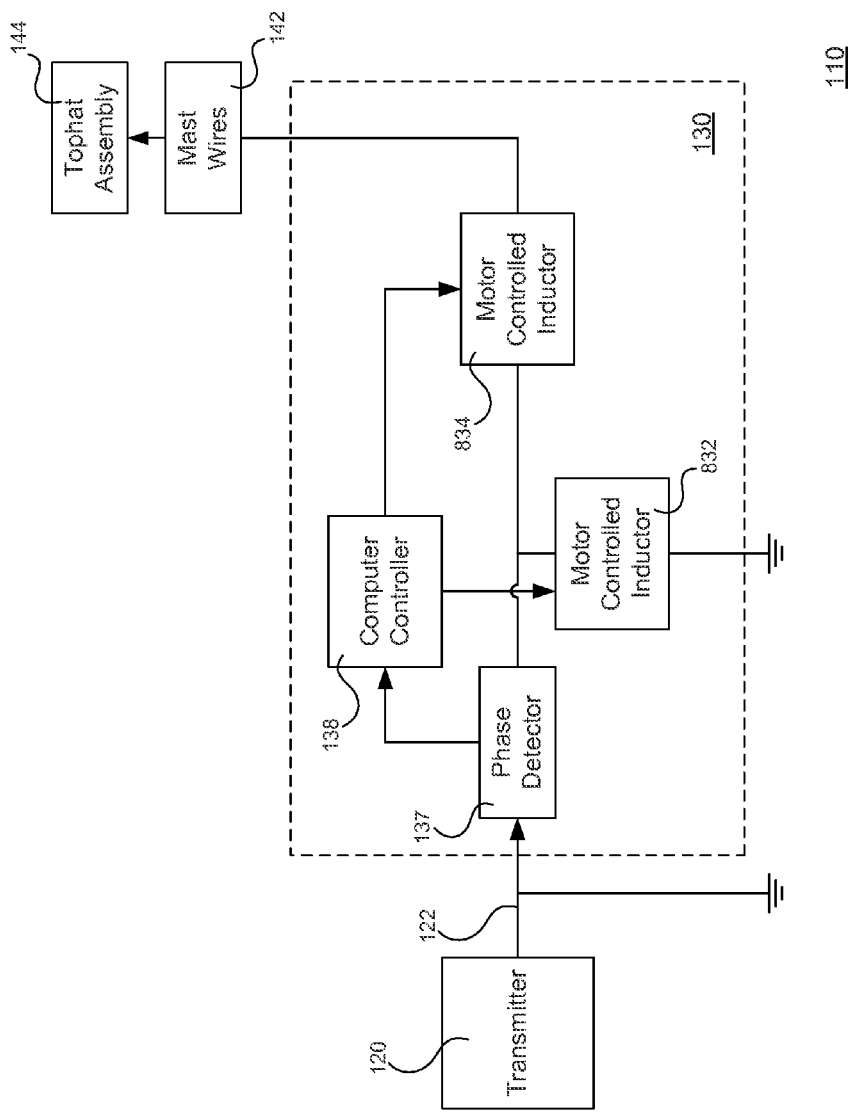
FIG. 11 is a block diagram of one embodiment of a frequency agile electrically small tactical AM broadcast band antenna system.

FIG. 11 is a block diagram of one embodiment of a frequency agile electrically small tactical AM broadcast band antenna system (FAAS). FIG. 11 is substantially similar to FIGS. 1, 6, and 8, and thus, similar/identical components are not described in detail again. As shown in FIG. 11, FAAS 110 includes transmitter 120, transmission line 122, ATU 130, mast wires 142, and configurable tophat assembly 144.

In the embodiment shown in FIG. 11, ATU 130 comprises phase detector 137, computer controller 138, motor-controlled shunt variable inductor 832, and motor-controlled series variable inductor 834. Phase detector 137 is operatively coupled to and receives signals from transmission line 122 and a node comprising terminals from motor-controlled shunt variable inductor 832 and motor-controlled series variable inductor 834. Phase detector 137 is a phase detector or phase comparator designed to indicate the difference in phase between signals in transmission line 122 and signals in ATU 130 by outputting a phase difference signal. In one embodiment, the output signal is a voltage signal. Phase detector 137 is also operatively coupled to computer controller 138. Phase detector 137 outputs a phase difference signal to computer controller 138, wherein the phase difference signal represents the difference in phase between signals in transmission line 122 and ATU 130. Computer controller 138 is operatively coupled to motor-controlled shunt variable inductor 832 and motor-controlled series variable inductor 834. Computer controller 138 outputs control signals to motor-controlled shunt variable inductor 832 and motor-controlled series variable inductor 834 based on the phase difference signal. In one embodiment, computer controller 138 stops outputting control signals to motor-controlled shunt variable inductor 832 and motor-controlled series variable inductor 834 when the phase difference signal is below a predetermined threshold. One of ordinary skill in the art shall recognize that computer controller 138 can use any number of well-known algorithms for outputting control signals to motor-controlled shunt variable inductor 832 and motor-controlled series variable inductor 834 based on the phase difference signal.

Figure 12:
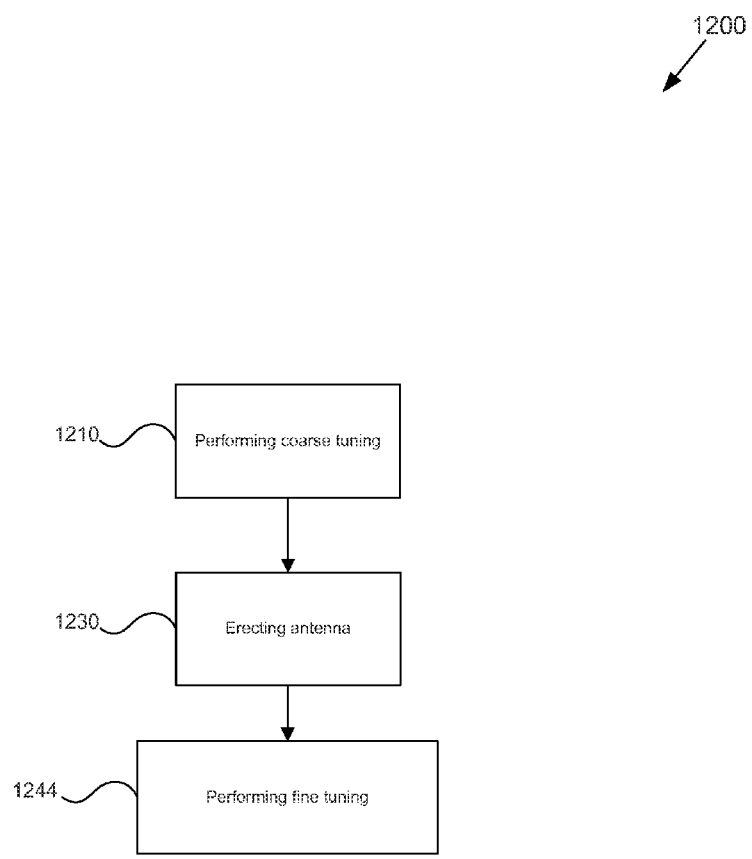
FIG. 12 is a flowchart of one embodiment of a method of tuning a frequency agile electrically small tactical AM broadcast band antenna system.

FIG. 12 is a flowchart of one embodiment of a method of tuning a FAAS. As shown in FIG. 12, the method begins at BOX 1210 of flowchart 1200 where the method performs coarse tuning. In one embodiment of BOX 1210, the method determines a desired operating frequency and configures tophat jumpers of a FAAS accordingly. After BOX 1210, the method proceeds to BOX 1230. At BOX 1230, the method erects an antenna of a FAAS. In one embodiment of BOX 1230, the method erects a base mast, tophat disc, and tophat wires using mast wires. After BOX 1230, the method proceeds to BOX 1244. At BOX 1244, the method performs fine tuning. In one embodiment of BOX 1244, the method adjusts inductor values for variable inductors based on a phase detector output signal or a VSWR meter reading.

Figure 13:
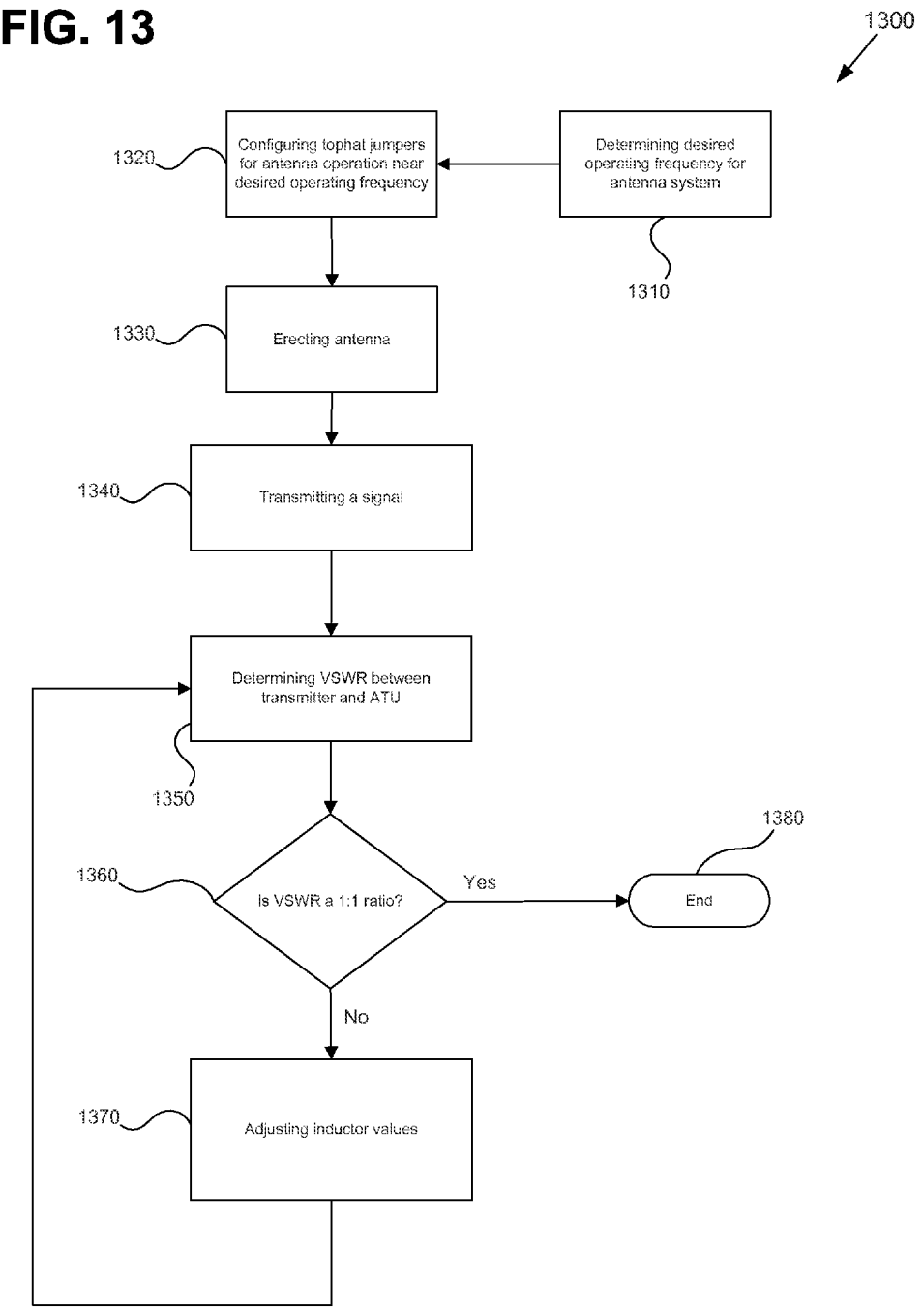
FIG. 13 is a flowchart of one embodiment of a method of tuning a frequency agile electrically small tactical AM broadcast band antenna system.

FIG. 13 is a flowchart of one embodiment of a method of tuning a FAAS. While flowchart 1300 is sufficient to describe one embodiment of an exemplary method of tuning a FAAS, other embodiments may utilize procedures different from those shown in flowchart 1300 without departing from the scope or spirit of the method.

As shown in FIG. 13, the method begins at BOX 1310 of flowchart 1300 where the method determines a desired operating frequency for a FAAS. After BOX 1310, the method proceeds to BOX 1320. At BOX 1320 of flowchart 1300, the method configures tophat jumpers of a FAAS for antenna operation near the desired operating frequency. After BOX 1320, the method proceeds to BOX 1330. At BOX 1330 of flowchart 1300, the method erects an antenna of a FAAS. In one embodiment of BOX 1330, the method erects a base mast, tophat disc, and tophat wires using mast wires. After BOX 1330, the method proceeds to BOX 1340. At BOX 1340, the method transmits a signal. In one embodiment of BOX 1340, the method transmits a low power signal. After BOX 1340, the method proceeds to BOX 1350. At BOX 1350, the method determines a VSWR between transmitter 120 and ATU 130. In one embodiment of BOX 1350, the method uses VSWR meter 136 to determine a VSWR between transmitter 120 and ATU 130. After BOX 1350, the method proceeds to BOX 1360. At BOX 1360, the method determines whether a VSWR is a 1:1 ratio. If the VSWR is at or near a 1:1 ratio, then the method proceeds to BOX 1380 where the method ends. If the VSWR is not at or near a 1:1 ratio, then the method proceeds to BOX 1370. At BOX 1370 of flowchart 1300, the method adjusts inductor values. In one embodiment of BOX 1370 of flowchart 1300, the method adjusts a shunt variable inductor and a series variable inductor of ATU 130. After BOX 1370, the method returns to BOX 1350.

Figure 14:
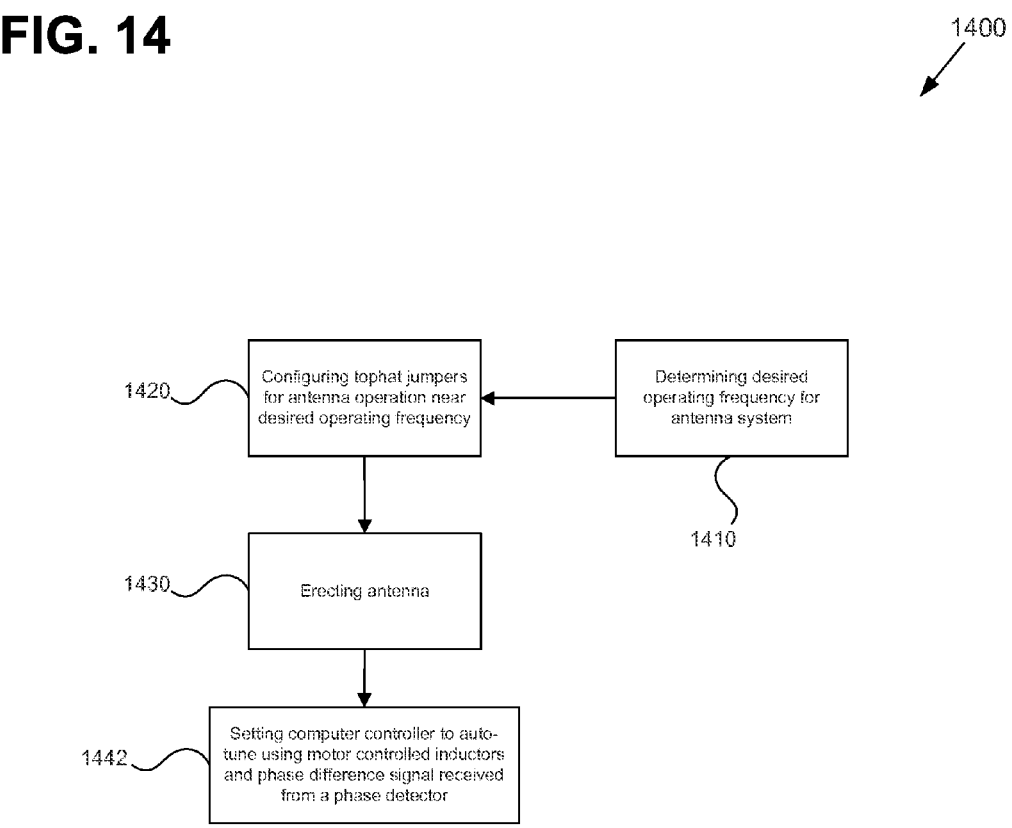
FIG. 14 is a flowchart of one embodiment of a method of tuning a frequency agile electrically small tactical AM broadcast band antenna system.

FIG. 14 is a flowchart of one embodiment of a method of tuning a FAAS. While flowchart 1400 is sufficient to describe one embodiment of an exemplary method of tuning a FAAS, other embodiments may utilize procedures different from those shown in flowchart 1400 without departing from the scope or spirit of the method.

As shown in FIG. 14, the method begins at BOX 1410 of flowchart 1400 where the method determines a desired operating frequency for a FAAS. After BOX 1410, the method proceeds to BOX 1420. At BOX 1420 of flowchart 1400, the method configures tophat jumpers of a FAAS for antenna operation near the desired operating frequency. After BOX 1420, the method proceeds to BOX 1430. At BOX 1430 of flowchart 1400, the method erects an antenna of a FAAS. In one embodiment of BOX 1430, the method erects a base mast, tophat disc, and tophat wires using mast wires. After BOX 1430, the method proceeds to BOX 1442. At BOX 1442, the method sets a computer controller to auto-tune using a phase detector output and motor controlled variable inductors. In one embodiment of BOX 1442, the method uses computer controller 138 that receives a phase difference signal from phase detector 137 and computer controller 138 outputs control signals to motor-controlled shunt variable inductor 832 and motor-controlled series variable inductor 834 based on the phase difference signal.

What is claimed is:

1. A method, comprising:
   determining a desired operating frequency for a frequency agile electrically small tactical AM broadcast band antenna system;
   configuring tophat jumpers of said frequency agile electrically small tactical AM broadcast band antenna system to operate near said desired operating frequency;
   erecting an antenna of said frequency agile electrically small tactical AM broadcast band antenna system;
   transmitting a signal through said frequency agile electrically small tactical AM broadcast band antenna system;
   adjusting inductor values of an antenna tuning unit of said frequency agile electrically small tactical AM broadcast band antenna system so that said frequency agile electrically small tactical AM broadcast band antenna system operates at said desired operating frequency;
   wherein said adjusting values step further comprises;
      a) determining a voltage standing wave ratio between a transmitter and said antenna tuning unit output;
      b) determining whether said voltage standing wave ratio is at or near a 1:1 ratio:
      c) adjusting inductor values if said voltage standing wave ratio is not at or near a 1:1 ratio, and ending the method otherwise; and,
      d) returning to said determining a voltage standing wave ratio between a transmitter and said antenna tuning unit output step.

2. The method of claim 1, wherein said erecting an antenna step comprises erecting a base mast, a tophat disc, and a plurality of tophat wires using a plurality of mast wires.

3. The method of claim 1, wherein said transmitting a signal step comprises transmitting a low power signal.

4. The method of claim 1, wherein said adjusting inductor values step comprises adjusting a shunt variable inductor and a series variable inductor of said antenna tuning unit.

5. The method of claim 1, wherein said determining a voltage standing wave ratio step comprises a determining a voltage standing wave ratio between a transmitter and said antenna tuning unit output using a voltage standing wave ratio meter.

6. The method of claim 1, wherein said adjusting inductor values step further comprises setting a computer controller to auto-tune using a phase detector output and motor controlled variable inductors.

7. The method of claim 6, wherein said setting a computer controller to auto-tune step comprises:
   a) receiving a phase difference signal by said computer controller from a phase detector;
   b) outputting control signals by said computer controller to a motor-controlled shunt variable inductor and a motor-controlled series variable inductor based on said phase difference signal.

8. A method, comprising:
   determining a desired operating frequency for a frequency agile electrically small tactical AM broadcast band antenna system;
   configuring tophat jumpers of said frequency agile electrically small tactical AM broadcast band antenna system to operate near said desired operating frequency;
   erecting an antenna of said frequency agile electrically small tactical AM broadcast band antenna system;
   transmitting a signal through said frequency agile electrically small tactical AM broadcast band antenna system;
   determining a voltage standing wave ratio between a transmitter and said antenna tuning unit output;
   determining whether said voltage standing wave ratio is at or near a 1:1 ratio;
   adjusting inductor values if said voltage standing wave ratio is not at or near a 1:1 ratio, and ending the method otherwise;
   returning to said determining a voltage standing wave ratio between a transmitter and said antenna tuning unit output step.

\* \* \* \* \*